United States Patent [19]

Vanstrom et al.

[11] 3,726,962

[45] Apr. 10, 1973

[54] SODIUM ALUMINUM PHOSPHATE AND PROCESS FOR PREPARATION

[75] Inventors: Reginald E. Vanstrom, Dobbs Ferry, N.Y.; Julian E. Blanch, Stamford, Conn.

[73] Assignee: Stauffer Chemical Company, New York, N.Y.

[22] Filed: Apr. 29, 1971

[21] Appl. No.: 138,804

Related U.S. Application Data

[63] Continuation of Ser. No. 815,209, April 10, 1969, abandoned, which is a continuation-in-part of Ser. No. 649,782, June 2, 1967, abandoned.

[52] U.S. Cl. ................................423/306, 99/95
[51] Int. Cl.....C01b 25/36, C01b 25/26, C01b 25/30
[58] Field of Search....................23/105, 106, 106 A, 23/107; 99/95

[56] References Cited

UNITED STATES PATENTS 3,223,479 12/1965 Vanstrom..............................23/107
3,244,535 4/1966 Lauck et al.........................23/105 X
3,501,314 3/1970 Kichline et al. ..........................99/95

Primary Examiner—Oscar R. Vertiz
Assistant Examiner—Gregory A. Heller
Attorney—Wayne C. Jaeschke and Daniel S. Ortiz

[57] ABSTRACT

A compound of the general formula:

$$Na_3Al_3H_{15}(PO_4)_9 \cdot 2.5H_2O$$

and process for preparing said compound which comprises reacting a sodium compound selected from sodium hydroxide, sodium carbonate, sodium aluminate and sodium orthophosphate; a trivalent aluminum compound selected from sodium aluminate and hydrated alumina; and a phosphorus containing compound selected from orthophosphoric acid and sodium orthophosphate, said reaction being conducted in the presence of a minor amount of water at a temperature between about 75°C. and about 105°C. wherein the reactants are present in an amount sufficient to provide a sodium aluminum acid orthophosphate with an atomic ratio of Na:Al:P of about 3:3:9.

4 Claims, No Drawings

SODIUM ALUMINUM PHOSPHATE AND PROCESS FOR PREPARATION

This application is a continuation of application Ser. No. 815,209, filed Apr. 10, 1969 now abandoned which was a continuation-in-part of application Ser. No. 649,782 filed June 2, 1967, entitled SODIUM ALUMINUM PHOSPHATE AND PROCESS FOR PREPARATION, and now abandoned.

This invention relates to a new leavening compound. More specifically, this invention is related to a novel complex crystalline sodium aluminum acid orthophosphate and its method of manufacture.

There are today several known compounds classified as sodium aluminum acid orthophosphates. The most important commercial compound is that of the formula, $NaAl_3H_{14}(PO_4)_8 \cdot 4H_2O$ (disclosed in U.S. Pat. No. 2,550,490), which is usually given the generic name sodium aluminum phosphate or simply referred to as SAP. SAP and other known sodium aluminum acid orthophosphates are useful, for example, as leavening agents for a variety of baked goods, as melt-controlling additives for cheese, and as fat-binding additives for meats. Each of the sodium aluminum acid orthophosphates, however, has a particular application for which it is most useful. This may be exemplified by reference to the baking art. For example, the sodium aluminum acid orthophosphate referred to above is characterized by a slow gas release which occurs in the oven when the dough or batter temperature reaches approximately 120°F. Typical uses for SAP include cake mixes, pancakes, waffle mixes, biscuit mixes, and muffin mixes. Other sodium aluminum acid orthophosphates are noted for their intermediate gas release and are useful in refrigerated products where the dough temperature is controlled at approximately 60°F. during manufacturing.

It has now been discovered that a new complex sodium aluminum acid orthophosphate of the formula, $Na_3Al_3H_{15}(PO)_9 \cdot 2.5H_2O$ exhibits a leavening activity not heretofore observed in any of the sodium aluminum acid orthophosphate leavening agents or other known leavening agents. Initially, this compound like SAP is noted for a slow high temperature gas release which renders it useful for cake leavening. In addition, however, it later causes a second gas release which occurs just prior to the completion of baking and effects a desirable round or dome-like shape to the cake.

The new compound at room temperature is in the form of finely divided white particles. X-ray powder patterns show that the compound has a crystalline structure very much like the reaction product disclosed in U.S. Pat. No. 3,233,479 issued Dec. 14, 1965. Although the compound of this invention is present in the aforesaid reaction product, the compound of this invention is a pure compound which exhibits a completely different leavening effect. For convenience, the compound of this invention will alternatively be referred to as 3:3:9 or the 3:3:9 compound. The aforesaid ratio represents the atomic ratio of Na:Al:P in the molecule.

The method which is preferred for preparing the new compound comprises reacting sodium hydroxide or carbonate, a trivalent aluminum compound such as $Al_2O_3 \cdot 3H_2O$ and aqueous orthophosphoric acid, the reactants being in sufficient proportions to produce a compound with an atomic ratio of Na:Al:P of about 3:3:9. The reaction mixture, a translucent viscous liquid, is thereafter heated under reflux until crystals are formed. The crystals can be recovered by first washing with water; then with a solvent. The crystals are then dried until a constant weight is reached and the product is recovered as finely divided opaque, white crystals having the above approximate chemical composition.

Other reactants may be employed such as sodium aluminate and sodium orthophosphate. The reactants are somewhat limited, however, since they must be soluble in the phosphoric acid; not inhibit product formation or make separation of the products difficult. It is necessary to have some water in the reaction mixture in order to maintain a liquid solution in which crystallization may occur. The necessary water may be supplied, however, by employing aqueous orthophosphoric acid of from about 80 percent to about 90 percent. By this method, it is unnecessary to add the required water to the reaction mixture. By utilizing the commercial 85 percent aqueous orthophosphoric acid, it has been found that a larger proportion of product can be recovered, employing various sodium-aluminum-phosphate ratios as will be hereinafter demonstrated.

The reaction can be conducted at a temperature between about 75°C. and 105°C., but is preferably maintained between 85°C. and 95°C. when the preferred temperature range is employed, the 3:3:9 compound will be produced over a fairly broad range of molar ratios as noted when the 85 percent aqueous orthophosphoric acid is used.

Any order of addition can be employed but it is preferred to first contact the sodium compound and aqueous orthophosphoric acid at a temperature between about 40°C. and 60°C.; then add the trivalent aluminum compound at a temperature between 90°C. and 105°C. By this order of addition, the reactants are more easily combined than is the case when the sodium is reacted with the viscous reaction product of the aluminum compound and orthophosphoric acid. The initial temperature of the reaction is maintained above about 75°C. and preferably at about 90°C., in order to prevent the formation of other compounds, and produce a reasonably quick reaction. Within this temperature range, the reaction is rapid and is complete in from about five to about six hours. The reaction is then discontinued or the reaction temperature is lowered to between about 50°C. and 60°C. and maintained within that range for approximately 16 to 20 hours to recover additional product. The major proportion of the product produced will be recovered in the first 5 to 6 hours providing the reaction temperature is maintained between about 85°C. and 95°C. At temperatures less than about 85°C., the reaction is of course slower, and at temperatures around 60°C., the product formed is not the desired compound.

The product can easily be recovered by washing the precipitate with water to remove the orthophosphoric acid; then the precipitate can be washed with an organic solvent which is miscible with water such as the ketones or alcohols. The product is then dried to remove the solvent which drying can be accomplished by heating the product for about 1 hour at 100°C.

Illustrative of the invention process are the following examples, wherein all parts and percentages are by weight.

EXAMPLE 1

In a three-necked 1000 cc. reaction flask fitted with a stirrer, thermometer and water cooled reflux condenser is placed 200 grams of 85 percent orthophosphoric acid. To the acid is then added 30.6 grams of sodium carbonate, sufficiently slow to maintain the temperature of the reaction between about 40°C. and 60°C. To this mixture is then added 30 grams of hydrated alumina and the mixture is heated to maintain the temperature of the reaction mixture between about 85°C. and 90°C. The reaction is conducted at 90°C. and after 3 hours, a precipitation is noted. After about 5 hours no further precipitation is noted and the reaction is discontinued. The precipitate is filtered under reduced pressure and the damp crystals washed first with water; then washed with ethanol and dried at 100°C. for 1 hour. Two samples of the product are analyzed and found to have the following analysis as compared with the theoretical.

| Analysis | Sample 1 | Sample 2 | Theo.+ |
|---|---|---|---|
| Na | 6.4 | 6.8 | 6.5 |
| Al | 7.4 | 7.5 | 7.6 |
| P | 26.2 | 25.8 | 26.2 |
| $H_2O$ | 17.0 | 16.8 | 16.9 |

The exact sodium:aluminum:phosphate atomic ratio of Sample 1 is 3.042:3:9.24. The exact sodium:aluminum:phosphate of Sample 2 is 3.19:3:8.9. Thus, the general imperical formula for the compositions of the present invention can be stated as follows:

$$+Na_3Al_3H_{15}(PO_4)_9 \cdot 2.5H_2O$$

The compound is further found to have an oblique extinction under the crossed Nicols; refractive indices of 1.518 and 1.564; and an X-ray powder pattern with major lines at approximately 3.07 A, 4.00 A, and 8.10 A.

EXAMPLE 2

The procedure of Example 1 is repeated employing the aforesaid reactants in various molar proportions and the listed atomic ratios are found to produce the 3:3:9 compound.

| Na | Al | P |
|---|---|---|
| 2.5 | 2.25 | 10 |
| 2.5 | 2.5 | 10 |
| 2.5 | 2.7 | 10 |
| 2.75 | 2.25 | 10 |
| 2.75 | 2.75 | 10 |
| 2.75 | 3.00 | 10 |

EXAMPLE 3

The procedure of Example 1 is repeated employing 80% $H_3PO_4$ and the other aforesaid reactants in various molar proportions, and the following atomic ratios are found to produce the 3:3:9 compound.

| Na | Al | P |
|---|---|---|
| 2.7 | 1.9 | 10 |
| 3.4 | 1.9 | 10 |
| 2.7 | 2.3 | 10 |
| 3.0 | 2.25 | 10 |
| 3.25 | 2.25 | 10 |
| 3.6 | 2.2 | 10 |

EXAMPLE 4

The procedure of Example 1 is repeated employing 75% $H_3PO_4$, all other conditions being the same; and 85% $H_3PO_4$ and the 100°C. reaction temperature, all other conditions being the same. Only the 3:2:9 atomic ratio is found to produce the 3:3:9 compound.

In the following two tables successful and unsuccessful molar ratios are compared employing 85% $H_3PO_4$, 80% $H_3PO_4$, and 75% $H_3PO_4$ as indicated. All other conditions and reactants as are described in Example 1.

TABLE I

| | Na:Al:P Ratio | Product |
|---|---|---|
| 85% $H_3PO_4$ | 3:2:10 | Essentially all 3:3:9 |
| | 3.3:2.2:10 | " |
| | 3:2.5:10 | " |
| | 3.3:2.8:10 | About 50% 3:3:9 |
| | 3.3:2.5:10 | Essentially all 3:3:9 |
| | 3.15:2.65:10 | About 50% 3:3:9 |
| | 3:1.5:10 | None |
| | 2.5:1.7:10 | None |
| | 2.5:2.1:10 | About 50% 3:3:9 |
| | 2.5:2.5:10 | Essentially all 3:3:9 |
| | 2.7:2.3:10 | " |
| | 2.5:2.3:10 | " |
| | 2.7:1.8:10 | None |

TABLE II

| % $H_3PO_4$ | Na:Al:P Ratio | Product |
|---|---|---|
| 80 | 3.3:2.2:10 | Essentially all 3:3:9 |
| 80 | 3.3:2.8:10 | None |
| 80 | 3.3:2.5:10 | Essentially all 3:3:9 |
| 80 | 3:2:10 | " |
| 75 | 3.3:2.2:10 | Essentially all 3:3:9 |
| 75 | 3.3:2.8:10 | None |
| 75 | 3:2:10 | None |

EXAMPLE 5

The procedure of the aforesaid examples is repeated employing alternatively sodium hydroxide, sodium aluminate and sodium orthophosphate as the sodium compound; sodium aluminate as the aluminum compound; and sodium orthophosphate as the phosphorus compound. The 3:3:9 compound is produced and recovered.

EXAMPLE 6

In order to evaluate the 3:3:9 compound as a leavening acid, three "standard" cakes were prepared utilizing the following ingredients in the indicated proportions:

| | grams |
|---|---|
| Sugar (powdered) | 115.9 |
| Flour | 109.2 |
| Non-fat dry milk | 5.2 |
| Shortening | 27.6 |
| Sodium bicarbonate | 2.1 |
| Salt | 1.8 |
| Carboxy methyl cellulose | 1.8 |
| Total | 263.6 grams |

The above ingredients with the exception of the shortening were mixed in a Hobart mixer set at speed 1 for about 3 minutes. The mixture was fairly homogeneous although some ¼ inch globules were noted. The shortening was then added and the mixture thoroughly mixed in a cake finisher. The temperature of the mixture was maintained at 75°F. and approximately 2 minutes was required to work in the shortening. To the mixture were then added 2.5 grams of 3:3:9 compound, 160 grams of water and 1 egg. The mixture was blended in a Hamilton Beach mix-master at medium speed for four minutes; then placed in a greased cake pan dusted with one-half teaspoon of flour, and baked in a preheated oven at 350°F. for 30 minutes. The cakes were observed to have a rounded dome-like top which measured between 6° and 10° on an angle from the side of the cake, at the top of the pan, to the center and topmost point of the cake.

Six additional cakes were prepared by the above procedure: three of which contained a neutralizing amount (2.1 grams) of a leavening acid consisting of 92.5% SAP, 6.5% $Al_2SO_4$ and 1 percent tricalcium phosphate, and three contained a neutralizing amount (6.3 grams) of dicalcium phosphate duohydrate (DCP). All other ingredients and proportions were the same as the cakes containing the 3:3:9 compound. The cakes were then baked and measured in accordance with the above procedure. Both types of cakes had domes whose angles measured approximately 2°.

EXAMPLE 7

The reactivity of the composition as set forth in Example 1, Sample 1, was measured and compared to the reactivity of prior art compositions. Specifically, the prior art composition consisted of the material as set forth in Example 1 of U.S. Pat. No. 3,233,479 having the same analysis as set forth therein. A second prior art composition compared may be defined as a commercial leavening acid having a sodium:aluminum:phosphate atomic ratio of 1:3:8. Thus, a flour base was made by intermixing together flour, dry skim milk and egg yolk for 10 minutes and then a recommended shortening mixture consisting of shortening, sugar and salt was intermixed with the flour base. The flour base and shortening mixture are both standard compositions. Then, sodium bicarbonate was mixed therein. The mixture was then divided into three different standard batches for testing. To one batch was added 1.07 grams of the sodium:aluminum:phosphate composition as set forth in Example 1, Sample 1. To the second batch was added 1.07 grams of the sodium:aluminum:phosphate having an atomic ratio of 3:3:8 as set forth in U.S. Pat. No. 3,233,479. to the third batch was added 1.07 grams of a sodium:aluminum:phosphate composition having an atomic ratio of 1:3:8. Water was then added to each one in a predetermined amount. The amount of carbon dioxide released from each batch was then measured at 2 minutes and 15 minutes. The results of this measurement are as follows:

| Composition | 2 minutes | 15 minutes |
|---|---|---|
| Na:Al:P ratio of 3:3:9 | 33 cc | 34 cc |
| Na:Al:P ratio of 3:3:8 | 53 cc | 63 cc |
| Na:Al:P ratio of 1:3:8 | 46 cc | 66 cc |

As can be seen from the above results, the substantial differences of the measured rate of release of carbon dioxide clearly indicates a substantial difference in functional properties between the three compositions tested. Moreover, this substantial difference in the functional properties between the three compositions clearly indicate a substantial difference in reactivity.

What is claimed is:

1. A compound of the general formula:

$$Na_3Al_3H_{15}(PO_4)_9 \cdot 2.5H_2O$$

2. The process for producing a complex sodium aluminum acid orthophosphate of the empirical formula $Na_3Al_3H_{15}(PO_4)_9 \cdot 2.5H_2O$ which comprises reacting a sodium compound selected from sodium hydroxide, sodium carbonate, sodium aluminate and sodium orthophosphate; a trivalent aluminum compound selected from sodium aluminate and hydrated alumina; and a phosphorus containing compound selected from orthophosphoric acid and sodium orthophosphate, in a liquid reaction mixture in the presence of a minor amount of water at a temperature between about 75° C. and about 105° C. until crystals are precipitated from the liquid reaction mixture and separating said crystals from the liquid reaction mixture, the reactants being present in an amount sufficient to provide a sodium aluminum acid orthophosphate with an atomic ratio of Na:Al:P of about 3:3:9.

3. The process of claim 2 wherein the reactants are sodium carbonate, hydrated alumina and orthophosphoric acid.

4. The process of claim 3 wherein the reaction is conducted at a temperature of between about 85° C. and about 95° C.

* * * * *